(12) United States Patent
Heck et al.

(10) Patent No.: US 9,858,343 B2
(45) Date of Patent: Jan. 2, 2018

(54) PERSONALIZATION OF QUERIES, CONVERSATIONS, AND SEARCHES

(75) Inventors: Larry Paul Heck, Los Altos, CA (US); Madhusudan Chinthakunta, Saratoga, CA (US); David Mitby, Mountain View, CA (US); Lisa Stifelman, Palo Alto, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 107 days.

(21) Appl. No.: 13/077,303

(22) Filed: Mar. 31, 2011

(65) Prior Publication Data
US 2012/0253790 A1 Oct. 4, 2012

(51) Int. Cl.
*G06F 17/27* (2006.01)
*G06F 17/30* (2006.01)

(52) U.S. Cl.
CPC .... *G06F 17/30867* (2013.01); *G06F 17/2785* (2013.01); *G06F 17/30684* (2013.01); *G06F 17/30731* (2013.01); *G06F 17/30734* (2013.01)

(58) Field of Classification Search
CPC ........ G06F 17/27; G06F 17/274; G06F 17/30; G06F 17/30734; G06F 17/2785; G06F 17/30684; G06F 17/30731; G06F 17/30867
USPC ............................................ 704/9, 257, 260
See application file for complete search history.

(56) References Cited

U.S. PATENT DOCUMENTS

| | | | |
|---|---|---|---|
| 4,560,977 A | 12/1985 | Murakami et al. | |
| 4,688,195 A | 8/1987 | Thompson | |
| 4,727,354 A | 2/1988 | Lindsay | |
| 4,772,946 A | 9/1988 | Hammer | |
| 4,811,398 A | 3/1989 | Copperi et al. | |
| 4,868,750 A | 9/1989 | Kucera et al. | |
| 4,969,192 A | 11/1990 | Chen et al. | |
| 5,146,406 A | 9/1992 | Jensen | |
| 5,259,766 A | 11/1993 | Sack | |
| 5,265,014 A | 11/1993 | Haddock et al. | |
| 5,299,125 A | 3/1994 | Baker | |
| 5,325,298 A | 6/1994 | Gallant | |
| 5,418,948 A | 5/1995 | Turtle | |

(Continued)

FOREIGN PATENT DOCUMENTS

| | | |
|---|---|---|
| CN | 1313972 | 9/2001 |
| CN | 1325527 | 12/2001 |

(Continued)

OTHER PUBLICATIONS

Jung, J. Jason, "Ontology-based context synchronization for an ad hoc social collaborations", Knowledge-Based Systems, 21 (2008), 573-580), hereinafter referred to a Jung.*

(Continued)

*Primary Examiner* — Samuel G Neway
(74) *Attorney, Agent, or Firm* — Merchant & Gould P.C.

(57) ABSTRACT

Personalization of user interactions may be provided. Upon receiving a phrase from a user, a plurality of semantic concepts associated with the user may be loaded. If the phrase is determined to comprise at least one of the plurality of semantic concepts associated with the user, a first action may be performed according to the phrase. If the phrase is determined not to comprise at least one of the plurality of semantic concepts associated with the user, a second action may be performed according to the phrase.

20 Claims, 5 Drawing Sheets

(56) References Cited

U.S. PATENT DOCUMENTS

| | | |
|---|---|---|
| 5,600,765 A | 2/1997 | Ando et al. |
| 5,680,628 A | 10/1997 | Carus et al. |
| 5,694,559 A | 12/1997 | Hobson et al. |
| 5,737,734 A | 4/1998 | Schultz |
| 5,748,974 A | 5/1998 | Johnson |
| 5,794,050 A | 8/1998 | Dahlgren et al. |
| 5,819,260 A | 10/1998 | Lu et al. |
| 5,861,886 A | 1/1999 | Moran et al. |
| 5,880,743 A | 3/1999 | Moran et al. |
| 5,895,464 A | 4/1999 | Bhandari et al. |
| 5,930,746 A | 7/1999 | Ting |
| 5,970,446 A | 10/1999 | Goldberg et al. |
| 6,212,494 B1 | 4/2001 | Boguraev |
| 6,222,465 B1 | 4/2001 | Kumar et al. |
| 6,246,981 B1 | 6/2001 | Papineni et al. |
| 6,256,033 B1 | 7/2001 | Nguyen |
| 6,397,179 B2 | 5/2002 | Crespo et al. |
| 6,401,086 B1 | 6/2002 | Bruckner |
| 6,411,725 B1 | 6/2002 | Rhoads |
| 6,512,838 B1 | 1/2003 | Rafii et al. |
| 6,539,931 B2 | 4/2003 | Trajkovic et al. |
| 6,553,345 B1 | 4/2003 | Kuhn et al. |
| 6,601,026 B2 | 7/2003 | Appelt et al. |
| 6,658,377 B1 | 12/2003 | Anward et al. |
| 6,665,640 B1 | 12/2003 | Bennett et al. |
| 6,674,877 B1 | 1/2004 | Jojic et al. |
| 6,895,083 B1 | 5/2005 | Bers et al. |
| 6,950,534 B2 | 9/2005 | Cohen et al. |
| 6,970,947 B2 | 11/2005 | Ebling et al. |
| 6,990,639 B2 | 1/2006 | Wilson |
| 6,999,932 B1 | 2/2006 | Zhou |
| 7,050,977 B1 | 5/2006 | Bennett |
| 7,100,082 B2 | 8/2006 | Little |
| 7,227,526 B2 | 6/2007 | Heldreth et al. |
| 7,231,609 B2 | 6/2007 | Baudisch |
| 7,251,781 B2 | 7/2007 | Batchilo et al. |
| 7,272,601 B1 | 9/2007 | Wang et al. |
| 7,308,112 B2 | 12/2007 | Fujimura et al. |
| 7,317,836 B2 | 1/2008 | Fujimura et al. |
| 7,328,216 B2 | 2/2008 | Hofmann et al. |
| 7,366,655 B1 | 4/2008 | Gupta |
| 7,367,887 B2 | 5/2008 | Watabe et al. |
| 7,519,223 B2 | 4/2009 | Dehlin et al. |
| 7,590,262 B2 | 9/2009 | Fujimura et al. |
| 7,596,767 B2 | 9/2009 | Wilson |
| 7,606,700 B2 | 10/2009 | Ramsey et al. |
| 7,617,200 B2 | 11/2009 | Budzik |
| 7,640,164 B2 | 12/2009 | Sasaki et al. |
| 7,665,041 B2 | 2/2010 | Wilson et al. |
| 7,672,845 B2 | 3/2010 | Beranek et al. |
| 7,704,135 B2 | 4/2010 | Harrison, Jr. |
| 7,716,056 B2 | 5/2010 | Weng et al. |
| 7,720,674 B2 | 5/2010 | Kaiser et al. |
| 7,720,856 B2 | 5/2010 | Goedecke et al. |
| 7,747,438 B2 | 6/2010 | Nguyen et al. |
| 7,756,708 B2 | 7/2010 | Cohen et al. |
| 7,797,303 B2 | 9/2010 | Roulland et al. |
| 7,869,998 B1 | 1/2011 | Di Fabbrizio |
| 7,890,500 B2 | 2/2011 | Bobrow et al. |
| 7,890,539 B2 | 2/2011 | Boschee et al. |
| 8,000,453 B2 | 8/2011 | Cooper et al. |
| 8,019,610 B2 | 9/2011 | Walker |
| 8,108,208 B2 | 1/2012 | Makela |
| 8,117,635 B2 | 2/2012 | Hendricks |
| 8,140,556 B2 | 3/2012 | Rao et al. |
| 8,144,840 B2 | 3/2012 | Luehrig et al. |
| 8,155,962 B2 | 4/2012 | Kennewick et al. |
| 8,165,886 B1 | 4/2012 | Gagnon |
| 8,180,629 B2 * | 5/2012 | Rehberg .................. 704/9 |
| 8,260,817 B2 | 9/2012 | Boschee et al. |
| 8,265,925 B2 | 9/2012 | Aarskog |
| 8,317,518 B2 | 11/2012 | Jarrell |
| 8,335,754 B2 | 12/2012 | Dawson et al. |
| 8,380,489 B1 | 2/2013 | Zhang |
| 8,448,083 B1 | 5/2013 | Migos |
| 8,489,115 B2 | 7/2013 | Rodriguez et al. |
| 8,521,766 B1 | 8/2013 | Hoarty |
| 8,595,222 B2 | 11/2013 | Dean |
| 8,595,642 B1 | 11/2013 | Lagassey |
| 8,600,747 B2 | 12/2013 | Abella et al. |
| 8,612,208 B2 | 12/2013 | Cooper et al. |
| 8,762,358 B2 | 6/2014 | Datta et al. |
| 8,825,661 B2 | 9/2014 | Joshi et al. |
| 9,064,006 B2 | 6/2015 | Hakkani-Tur |
| 9,082,402 B2 | 7/2015 | Yadgar |
| 9,123,341 B2 | 9/2015 | Weng |
| 9,197,736 B2 | 11/2015 | Davis |
| 9,244,984 B2 | 1/2016 | Heck et al. |
| 9,318,108 B2 | 4/2016 | Gruber |
| 2001/0020954 A1 | 9/2001 | Hull |
| 2001/0053968 A1 | 12/2001 | Galitsky |
| 2002/0165860 A1 | 11/2002 | Glover |
| 2003/0125955 A1 | 7/2003 | Arnold et al. |
| 2003/0137537 A1 | 7/2003 | Guo et al. |
| 2003/0236099 A1 | 12/2003 | Deisher et al. |
| 2004/0078725 A1 | 4/2004 | Little |
| 2004/0083092 A1 | 4/2004 | Valles |
| 2004/0117189 A1 | 6/2004 | Bennett |
| 2004/0122674 A1 | 6/2004 | Bangalore et al. |
| 2004/0172460 A1 | 9/2004 | Marel et al. |
| 2004/0189720 A1 | 9/2004 | Wilson et al. |
| 2004/0193420 A1 | 9/2004 | Kennewick et al. |
| 2004/0220797 A1 | 11/2004 | Wang et al. |
| 2004/0225499 A1 | 11/2004 | Wang et al. |
| 2005/0033582 A1 | 2/2005 | Gadd et al. |
| 2005/0074140 A1 | 4/2005 | Grasso et al. |
| 2005/0270293 A1 | 12/2005 | Guo et al. |
| 2005/0278164 A1 | 12/2005 | Hudson |
| 2005/0289124 A1 | 12/2005 | Kaiser et al. |
| 2006/0036430 A1 | 2/2006 | Hu |
| 2006/0074631 A1 | 4/2006 | Wang et al. |
| 2006/0074883 A1 | 4/2006 | Teevan et al. |
| 2006/0080101 A1 | 4/2006 | Chotimongkol et al. |
| 2006/0136375 A1 | 6/2006 | Cox et al. |
| 2006/0173868 A1 | 8/2006 | Angele et al. |
| 2006/0206306 A1 | 9/2006 | Cao |
| 2006/0206333 A1 | 9/2006 | Paek et al. |
| 2006/0206336 A1 | 9/2006 | Gurram et al. |
| 2006/0206454 A1 | 9/2006 | Forstall et al. |
| 2006/0235689 A1 | 10/2006 | Sugihara |
| 2006/0271353 A1 | 11/2006 | Berkan |
| 2006/0271520 A1 | 11/2006 | Ragan |
| 2006/0293874 A1 | 12/2006 | Zhang et al. |
| 2007/0038436 A1 * | 2/2007 | Cristo et al. .................. 704/9 |
| 2007/0071209 A1 | 3/2007 | Horvitz et al. |
| 2007/0100624 A1 | 5/2007 | Weng et al. |
| 2007/0106497 A1 | 5/2007 | Ramsey et al. |
| 2007/0118357 A1 * | 5/2007 | Kasravi et al. ................ 704/10 |
| 2007/0124134 A1 * | 5/2007 | Van Kommer ................ 704/10 |
| 2007/0124263 A1 | 5/2007 | Katariya et al. |
| 2007/0136068 A1 | 6/2007 | Horvitz |
| 2007/0136222 A1 | 6/2007 | Horvitz |
| 2007/0143155 A1 | 6/2007 | Whitsett et al. |
| 2007/0299799 A1 | 12/2007 | Meehan et al. |
| 2008/0005068 A1 | 1/2008 | Dumais et al. |
| 2008/0040114 A1 | 2/2008 | Zhou et al. |
| 2008/0040510 A1 | 2/2008 | Warner et al. |
| 2008/0080678 A1 | 4/2008 | Ma et al. |
| 2008/0082518 A1 | 4/2008 | Loftesness |
| 2008/0097951 A1 | 4/2008 | Gupta et al. |
| 2008/0140389 A1 | 6/2008 | Funakoshi |
| 2008/0140657 A1 | 6/2008 | Azvine et al. |
| 2008/0152191 A1 | 6/2008 | Fujimura et al. |
| 2008/0167876 A1 | 7/2008 | Bakis et al. |
| 2008/0168037 A1 | 7/2008 | Kapadia et al. |
| 2008/0172359 A1 | 7/2008 | Lundell et al. |
| 2008/0201280 A1 * | 8/2008 | Martin et al. .................. 706/12 |
| 2008/0201434 A1 | 8/2008 | Holmes et al. |
| 2008/0221870 A1 | 9/2008 | Attardi et al. |
| 2008/0228467 A1 | 9/2008 | Womack et al. |
| 2008/0231926 A1 | 9/2008 | Klug et al. |
| 2008/0235199 A1 | 9/2008 | Li et al. |
| 2008/0300871 A1 | 12/2008 | Gilbert |
| 2008/0306934 A1 | 12/2008 | Craswell et al. |

(56) References Cited

U.S. PATENT DOCUMENTS

| | | |
|---|---|---|
| 2008/0319944 A1 | 12/2008 | Venolia |
| 2008/0319962 A1 | 12/2008 | Riezler et al. |
| 2009/0006333 A1 | 1/2009 | Jones et al. |
| 2009/0006345 A1 | 1/2009 | Platt et al. |
| 2009/0006389 A1 | 1/2009 | Piscitello et al. |
| 2009/0012778 A1 | 1/2009 | Feng |
| 2009/0012842 A1 | 1/2009 | Srinivasan et al. |
| 2009/0027337 A1 | 1/2009 | Hildreth |
| 2009/0055380 A1 | 2/2009 | Peng et al. |
| 2009/0076917 A1 | 3/2009 | Jablokov et al. |
| 2009/0077047 A1* | 3/2009 | Cooper et al. ............ 707/4 |
| 2009/0079813 A1 | 3/2009 | Hildreth |
| 2009/0089126 A1 | 4/2009 | Odubiyi |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0141933 A1 | 6/2009 | Wagg |
| 2009/0177645 A1 | 7/2009 | Heck |
| 2009/0221368 A1 | 9/2009 | Yen et al. |
| 2009/0232288 A1 | 9/2009 | Forbes et al. |
| 2009/0234655 A1 | 9/2009 | Kwon |
| 2009/0248422 A1 | 10/2009 | Li et al. |
| 2009/0248659 A1 | 10/2009 | McCool et al. |
| 2009/0281789 A1 | 11/2009 | Waibel et al. |
| 2009/0292687 A1 | 11/2009 | Fan et al. |
| 2009/0315740 A1 | 12/2009 | Hildreth et al. |
| 2010/0023320 A1 | 1/2010 | DiCristo et al. |
| 2010/0023331 A1 | 1/2010 | Duta et al. |
| 2010/0036717 A1 | 2/2010 | Trest |
| 2010/0036831 A1 | 2/2010 | Vemuri |
| 2010/0057463 A1 | 3/2010 | Weng et al. |
| 2010/0057801 A1 | 3/2010 | Ramer et al. |
| 2010/0082610 A1 | 4/2010 | Anick |
| 2010/0093435 A1 | 4/2010 | Glaser et al. |
| 2010/0114574 A1 | 5/2010 | Liu et al. |
| 2010/0121839 A1 | 5/2010 | Meyer |
| 2010/0138215 A1 | 6/2010 | Williams |
| 2010/0138410 A1 | 6/2010 | Liu |
| 2010/0161642 A1 | 6/2010 | Chen et al. |
| 2010/0169098 A1 | 7/2010 | Patch |
| 2010/0199227 A1 | 8/2010 | Xiao et al. |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1 | 9/2010 | Bruno |
| 2010/0274796 A1 | 10/2010 | Beauregard et al. |
| 2010/0281435 A1 | 11/2010 | Bangalore et al. |
| 2010/0306591 A1 | 12/2010 | Krishna |
| 2010/0313125 A1 | 12/2010 | Fleizach |
| 2010/0318398 A1 | 12/2010 | Brun et al. |
| 2010/0318549 A1 | 12/2010 | Mayr |
| 2011/0016005 A1 | 1/2011 | Li et al. |
| 2011/0022992 A1 | 1/2011 | Zhou et al. |
| 2011/0040777 A1 | 2/2011 | Stefanov |
| 2011/0078159 A1 | 3/2011 | Li et al. |
| 2011/0082848 A1 | 4/2011 | Goldentouch |
| 2011/0099476 A1 | 4/2011 | Snook et al. |
| 2011/0105190 A1 | 5/2011 | Cha |
| 2011/0137943 A1 | 6/2011 | Asano |
| 2011/0144999 A1 | 6/2011 | Jang et al. |
| 2011/0219340 A1 | 9/2011 | Pathangay |
| 2011/0313768 A1 | 12/2011 | Klein et al. |
| 2011/0320470 A1 | 12/2011 | Williams et al. |
| 2011/0320945 A1 | 12/2011 | Wong |
| 2012/0030637 A1 | 2/2012 | Day et al. |
| 2012/0035924 A1 | 2/2012 | Jitkoff et al. |
| 2012/0059842 A1 | 3/2012 | Hille-Doering et al. |
| 2012/0078636 A1 | 3/2012 | Ferrucci |
| 2012/0130822 A1 | 5/2012 | Patwa et al. |
| 2012/0131073 A1 | 5/2012 | Olney |
| 2012/0136865 A1 | 5/2012 | Blom et al. |
| 2012/0166178 A1 | 6/2012 | Latzina |
| 2012/0197999 A1 | 8/2012 | Agarwal et al. |
| 2012/0216151 A1 | 8/2012 | Sarkar et al. |
| 2012/0242586 A1 | 9/2012 | Krishnaswamy |
| 2012/0253788 A1 | 10/2012 | Heck et al. |
| 2012/0253789 A1 | 10/2012 | Heck et al. |
| 2012/0253791 A1 | 10/2012 | Heck et al. |
| 2012/0253793 A1 | 10/2012 | Ghannam et al. |
| 2012/0253802 A1 | 10/2012 | Heck et al. |
| 2012/0254227 A1 | 10/2012 | Heck et al. |
| 2012/0254810 A1 | 10/2012 | Heck et al. |
| 2012/0290290 A1 | 11/2012 | Tur et al. |
| 2012/0296643 A1 | 11/2012 | Kristjansson et al. |
| 2012/0316862 A1 | 12/2012 | Sultan et al. |
| 2012/0327009 A1 | 12/2012 | Fleizach |
| 2013/0013644 A1 | 1/2013 | Sathish et al. |
| 2013/0117022 A1* | 5/2013 | Chen et al. .............. 704/235 |
| 2013/0185081 A1* | 7/2013 | Cheyer et al. ........... 704/275 |
| 2013/0273976 A1 | 10/2013 | Rao et al. |
| 2014/0006012 A1 | 1/2014 | Zhou et al. |
| 2014/0059030 A1 | 2/2014 | Hakkani-Tur et al. |
| 2015/0127323 A1 | 5/2015 | Jacquet |
| 2016/0004707 A1 | 1/2016 | Hakkani-Tur et al. |
| 2016/0118046 A1 | 4/2016 | Heck et al. |
| 2017/0011025 A1 | 1/2017 | Tur et al. |
| 2017/0075985 A1 | 3/2017 | Chakraborty et al. |

FOREIGN PATENT DOCUMENTS

| | | |
|---|---|---|
| CN | 1692407 | 11/2005 |
| CN | 1963752 | 10/2006 |
| CN | 1845052 | 5/2007 |
| CN | 1983271 | 6/2007 |
| CN | 101120341 | 2/2008 |
| CN | 101297355 | 10/2008 |
| CN | 101499277 | 5/2011 |
| EP | 1793318 | 6/2007 |
| EP | 1 335 338 A2 | 12/2007 |
| JP | 2001125592 | 5/2001 |
| JP | 2002-024285 | 1/2002 |
| JP | 2002-082748 | 3/2002 |
| JP | 2003-505712 | 2/2003 |
| JP | 2003-115951 | 4/2003 |
| JP | 2004212641 | 7/2004 |
| JP | 2004328181 | 11/2004 |
| JP | 2004341672 | 12/2004 |
| JP | 2005-043461 | 2/2005 |
| JP | 2006202159 | 8/2006 |
| JP | 2009205552 | 9/2009 |
| JP | 2010-128665 | 6/2010 |
| JP | 2010519609 | 6/2010 |
| JP | 2010-145262 | 7/2010 |
| JP | 2010-230918 | 10/2010 |
| KR | 1020050032649 | 4/2005 |
| KR | 10-1007336 B1 | 1/2011 |
| KR | 10-2011-0066357 | 6/2011 |
| TW | 504624 B | 10/2002 |
| WO | WO 00/73900 A1 | 12/2000 |
| WO | WO 00/75808 A1 | 12/2000 |
| WO | 2006042028 | 6/2006 |
| WO | WO 2007/064482 A1 | 6/2007 |
| WO | 2008/049206 A1 | 5/2008 |
| WO | WO 2008/069519 | 6/2008 |
| WO | WO 2009/059065 | 5/2009 |

OTHER PUBLICATIONS

Senior, et al., article entitled "Augmenting Conversational Dialogue by Means of Latent Semantic Googling,"—Published Date: Oct. 4-6, 2005, Trento, Italy; 7 pages, http://www.hml.queensu.ca/files/po265-senior.pdf.

Wang, et al., article entitled "Idea Expander: Agent-Augmented Online Brainstorming,"—Published Date: Feb. 6-10, 2010, Savannah, Georgia; 2 pages, http://research.microsoft.com/en-us/um/redmond/groups/connect/cscw_10/docs/p535.pdf.

Lyons, et al., article entitled "Augmenting Conversations Using Dual-Purpose Speech,"—Published Date: 2004; College of Computing and GVU Center, Georgia Institute of Technology, Atlanta, Georgia; 10 pages. http://www.cc.gatech.edu/ccg/publications/dp-uist.pdf.

(56) References Cited

OTHER PUBLICATIONS

Sherwani, et al., article entitled "VoicePedia: Towards Speech-based Access to Unstructured Information,"—Published Date: 2007; 4 pages http://www.cs.cmu.edu/~jsherwan/pubs/voicepedia.pdf.
Website: The Future of Voice Arrives—Published Date: Jan. 11, 2007; 2 pages http://www.voicebox.com/technology/.
Mairesse, et al., article entitled Learning to Personalize Spoken Generation for Dialogue Systems—Published Date: 2005; 4 pages. http://citeseerx.ist.psu.edu/viewdoc/download?doi=10.1.1.66.9988&rep=rep1&type=pdf.
Nguyen, et al., article entitled "An Adaptive Plan Based Dialogue Agent: Integrating Learning into a BDI Architecture," Published Date: May 8-12, 2006 at AAMASA '06 in Hakodate, Hokkaido, Japan; 3 pages. http://www.cse.unsw.edu.au/~wobcke/papers/adaptive-dialogue.pdf.
Website: Fully automated conversation dialog systems, Published Date: Jun. 10, 2008; 2 pages. http://www.gyruslogic.com/.
Technical Whitepaper entitled "Speak With Me, Inc." Retrieved Date: Sep. 24, 2010; 11 pages. http://www.speakwithme.com/files/pdf/whitepaper.pdf.
Castells, et al., article entitled "Scalable semantic personalized search of spoken and written contents on the Semantic Web,A" Published Date: 2005; 12 pages. http://webcache.googleusercontent.com/search?q=cache:http://ir.ii.uam.es/s5t/informes/TIN2005-06885.pdf.
Marcialis, et al., article entitled "Searchy: An Agent to Personalize Search Results," Published Date: Jun. 20, 2008 at the IEEE Third International Conference on Internet and Web Applications and Services Conference; 6 pages. http://ieeexplore.ieee.org/stamp/stamp.jsp?tp=&arnumber=4545664.
Tomuro et al., article entitled "Personalized Search in Folksonomies with Ontological User Profiles," Retrieved Date: Sep. 30, 2010; 14 pages. http://facweb.cs.depaul.edu/noriko/papers/iis09.pdf.
Mylonas et al., article entitled "Personalized information retrieval based on context and ontological knowledge," Retrieved Date: Sep. 30, 2010. Printed in the United Kingdom and Presented in The Knowledge Engineering Review, vol. 23:1, 73-100; 2007, Cambridge University Press, 28 pages. http://citeseerx.ist.psu.edu/viewdoc/download?doi=10.1.1.148.4272&rep=rep1&type=pdf.
Abstract entitled "Adding Intelligence to the Interface," Published Date: 1996 IEEE; 12 pages. http://www.hitl.washington.edu/publications/billinghurst/vrais96/.
Turunen et al. article entitled "Multimodal Interaction with Speech and Physical Touch Interface in a Media Center Application," Presented and Published Oct. 29-31, 2009 at Ace 2009 in Athens, Greece; 8 pages. http://delivery.acm.org/10.1145/1700000/1690392/p19-turunen.pdf?key1=1690392&key2=5824375821&coll=GUIDE&dl=GUIDE&CFID=103676711&CFTOKEN=24231502.
Moustakas et al., article entitled "Master-Piece: A Multimodal (Gesture+Speech) Interface for 3D Model Search and Retrieval Integrated in a Virtual Assembly Application," Presented and Published Jul. 18-Aug. 12, 2005 at Enterface '05 in Mons, Belgium; 14 pages. http://www.enterface.net/enterface05/docs/results/reports/project7.pdf.
Lee e al., article entitled "An Implementation of Multi-Modal Game Interface Based on PDAs," Published Date: Aug. 2007 at the IEEE Fifth International Conference on Software Engineering Research, Management and Applications; 8 pages. http://ieeexplore.ieee.org/stamp/stamp.jsp?tp=&arnumber=4297013.
Mark Billinghurst, article entitled "Put That Where? Voice and Gesture at the Graphics Interface," Published in the Nov. 1998 Computer Graphics, 5 pages. http://delivery.acm.org/10.1145/310000/307730/p60-billinghurst.pdf?key1=307730&key2=0278375821&coll=GUIDE&dl=GUIDE&CFID=103683245&CFTOKEN=90378528.
Stegmann, et al., abstract entitled "Multimodal Interaction for Access to Media Content," Retrieved Date: Sep. 29, 2010; 4 pages. http://www.icin.biz/files/2008papers/Poster-08.pdf.
Horiguchi et al., abstract entitled "GaChat: A chat system that displays online retrieval information in dialogue text," Published at the Workshop on Visual Interfaces to the Social and the Semantic Web Conference Feb. 8, 2009 in Sanibel Island, Florida; 5 pages. http://www.smart-ui.org/events/vissw2009/papers/VISSW2009-Horiguchi.pdf.
Aye, et al., article entitled "Use of Ontologies for Bridging Semantic Gaps in Distant Communication," Published Date: 2008; 5 pages. http://ieeexplore.ieee.org/stamp/stamp.jsp?tp=&arnumber=4781725.
Jebara et al., article entitled "Tracking Conversational Context for Machine Mediation of Human Discourse," Retrieved Date: Oct. 1, 2010; 3 pages. http://www.cs.columbia.edu/~jebara/papers/conversation.pdf.
Power Point Presentation entitled "Spoken Language Understanding for Conversational Dialog Systems," Presented and published at the IEEE/ACL 2006 Workshop on Spoken Language Technology in Aruba, Dec. 10-13, 2006; 33 pages. http://www.slt2006.org/MichaelMcTear.ppt.
Fabbrizio et al., abstract entitled "Bootstrapping Spoken Dialog Systems with Data Reuse," Retrieved Date: Oct. 12, 2010; 9 pages. http://www.sigdial.org/workshops/workshop5/proceedings/pdf/difabbrizio.pdf.
Website: Siri: Your Personal Assistant for the Mobile Web—Published Date: Feb. 4, 2010; 3 pages. http://www.readwriteweb.com/archives/siri_your_personal_assistant_for_the_mobile_web.php.
Abela, et al., abstract entitled "SemChat: Extracting Personal Information from Chat Conversations," Retrieved Date: Oct. 12, 2010; 10 pages. http://staff.um.edu.mt/cabe2/supervising/undergraduate/overview/keith_cortis.pdf.
Robert Brown, article entitled "Exploring New Speech Recognition and Synthesis APIs in Windows Vista," published in MSDN Magazine, Retrieved Date: Oct. 12, 2010; 11 pages. http://msdn.microsoft.com/en-us/magazine/cc163663.aspx.
U.S. Patent Application entitled "Augmented Conversational Understanding Agent" with U.S. Appl. No. 13/076,862, filed Mar. 31, 2011.
U.S. Patent Application entitled "Conversational Dialog Learning and Correction" having U.S. Appl. No. 13/077,233, filed Mar. 31, 2011.
U.S. Patent Application entitled "Combined Activation for Natural User Interface Systems" having U.S. Appl. No. 13/077,368, filed Mar. 31, 2011.
U.S. Patent Application entitled "Task Driven User Intents" having U.S. Appl. No. 13/077,396, filed Mar. 31, 2011.
U.S. Patent Application entitled "Augmented Conversational Understanding Architecture" having U.S. Appl. No. 13/077,431, filed Mar. 31, 2011.
U.S. Patent Application entitled "Location-Based Conversational Understanding" having U.S. Appl. No. 13/077,455, filed Mar. 31, 2011.
Lee, et al. Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72; 2 pgs. Obtained at: http://www.mt-archive.info/AMTA-1997-Lee.pdf.
Kuansan Wang, Abstract entitled "Semantics Synchronous Understanding for Robust Spoken Language Applications"—Published Date: 2003, pp. 640-645; 6 pgs. Obtained at: http://research.microsoft.com/pubs/77494/2003-kuansan-asru.pdf.
Antoine, et al., Abstract entitled "Automatic Adaptive Understanding of Spoken Language by Cooperation of Syntactic Parsing and Semantic Priming"—Published Date: 1994; 5 pgs. Obtained at: http://www-clips.imag.fr/geod/User/jean.caelen/Publis_fichiers/SyntaxeSemantique.pdf.
Tur, et al., Abstract entitled "Semi-Supervised Learning for Spoken Language Understanding Using Semantic Role Labeling"—Published Date: 2005, pp. 232-237; 6 pgs. Obtained at: http://ieeexplore.ieee.org/stamp/stamp.jsp?arnumber=01566523.
Finkel, et al., Abstract entitled "Incorporating Non-Local Information into Information Extraction Systems by Gibbs Sampling"—

(56) References Cited

OTHER PUBLICATIONS

Published Date: Jan. 3, 2006, 8 pgs. Obtained at: http://nlp.stanford.edu/~manning/papers/gibbscrf3.pdf.
Wang, et al, Article entitled "An Introduction to the Statistical Spoken Language Understanding"—Published in the IEEE Signal Processing Magazine, vol. 22, No. 5, pp. 16-31; 2005. http://research.microsoft.com/pubs/75236/2005-Wang-Deng-Acero-SPM.pdf.
Gorin, et al., Abstract entitled "How May I Help You?" Published in Speech Communication 23, Feb. 14, 1997, Revised May 23, 1997; pp. 113-127, 14 pgs. http://disi.unitn.it/~riccardi/papers/specom97.pdf.
P. J. Price, Abstract entitled "Evaluation of Spoken Language Systems: The ATIS Domain" Obtained on May 12, 2011, 5 pgs. from the following website: http://acl.ldc.upenn.edu/H/H90/H90-1020.pdf.
Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608, 4 pgs. Obtain at: http://citeseerx.ist.psu.edu/viewdoc/download?doi=10.1.1.106.2105&rep=rep1&type=pdf.
Jeong, et al., Abstract entitled "Exploiting Non-Local Features for Spoken Language Understanding" Published in the Proceedings of the COLING/ACL 2006 Main Conference Poster Sessions, pp. 412-419 in Sydney, Australia Jul. 2006; 8 pgs. Obtained copy at: http://www.aclweb.org/anthology/P/P06/P06-2054.pdf.
Moschitti, et al., Abstract entitled "Spoken Language Understanding with Kernels for Syntactic/ Semantic Structures" Published in the 2007 IEEE Proceedings, pp. 183-188; 6 pgs. Obtained at: http://ieeexplore.ieee.org/stamp/stamp.jsp?tp=&arnumber=4430106.
Hakkani-Tur, et al. Abstract entitled "Using Semantic and Syntactic Graphs for Call Classification" Published in the Proceedings of the ACL Workshop on Feature Engineering for Machine Learingin in NLP, pp. 24-31 in Ann Arbor, Michigan, Jun. 2005; 8 pgs. Obtained at: http://citeseerx.ist.psu.edu/viewdoc/download?doi=10.1.1.59.8566&rep=rep1&type=pdf.
Dowding, et al. Article entitled "Gemini: A Natural Language System for Spoken Language Understanding" pp. 54-61; 8 pgs. Obtained on May 12, 2011 at website: http://acl.ldc.upenn.edu/P/P93/P93-1008.pdf.
Stephanie Seneff. Article entitled "TINA: A Natural Language System for Spoken Language Applications" Published in the 1992 Edition of Association for Computational Linguistics, vol. 18, No. 1, pp. 61-86; 26 pgs. Obtained at: http://citeseerx.ist.psu.edu/viewdoc/download?doi=10.1.1.75.1626&rep=rep1&type=pdf.
Ward, et al. Abstract entitled "Recent Improvements in the CMU Spoken Language Understanding System." 4 pgs. Obtained on May 12, 2011 at website: http://www.aclweb.org/anthology/H/H94/H94-1039.pdf.
Vickrey, et al. Abstract entitled "Sentence Simplification for Semantic Role Labeling." 9 pgs. Obtained on May 12, 2011 at website: http://ai.stanford.edu/~dvickrey/underlying.pdf.
Vanderwende, et al. Abstract entitled "Microsoft Research at DUC2006: Task-Focused Summarization with Sentence Simplification and Lexical Expansion." 8 pgs. Obtained on May 12, 2011 at website: http://citeseerx.ist.psu.edu/viewdoc/download?doi=10.1.1.114.2486&rep=rep1&type=pdf.
Petrov et al., Abstract entitled "Learning and Inference for Hierarchically Split PCFGs" Published in 2007 in cooperation with the Association for the Advancement of Artificial Intelligence. 4 pgs. Obtained at: http://www.petrovi.de/data/aaai07.pdf.
Schapire, et al. Abstract entitled "BoosTexter: A Boosting-Based System for Text Categorization," 34 pgs. Obtaining May 12, 2011 at website: http://citeseerx.ist.psu.edu/viewdoc/download?doi=10.1.1.33.1666&rep=rep1&type=pdf.
He, et al. Abstract entitled "A Data-Driven Spoken Language Understanding System." 6 pgs. Obtained on May 12, 2011 at website: http://citeseerx.ist.psu.edu/viewdoc/download?doi=10.1.1.141.5688&rep=rep1&type=pdf.
Yaman, et al., Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214; 8 pgs. http://research.microsoft.com/pubs/73918/sibel.pdf.
Gillick, et al. Article entitled "Some Statistical Issues in the Comparison of Speech Recognition Algorithms." Published in the Proceedings at the IEEE Conference on Acoustics, Speech and Sig. Proc., Glasglow, 1989; pp. 532-535; 4pgs. http://citeseerx.ist.psu.edu/viewdoc/download?doi=10.1.1.162.2233&rep=rep1&type=pdf.
Tur, et al., Abstract entitled "What is Left to be Understood in ATIS?" Published in the Proceedings of the IEEE SLT Workshop in Berkeley, CA., 2010. (not readily available on any website); 6 pgs.
Brody, et al., Body language user interface (BLUI), http://adsabs.harvard.edu/abs/1998SPIE.3299 . . . 400B, accessed Aug. 17, 2009, 1 page.
Corominas, Aurora, "The Artist's Gesture. An initial approach to the cinematic representation of Vincent Van Gogh's pictorial practice", http://www.iua.upf.es/formats/formats3/cor_a.htm, accessed Aug. 17, 2009, 12 pages.
Gao et al., "VS: Facial Sculpting in the Virgual World", International Conference on Computational Intelligence for Modeling Control and Automation, and International Conference on Intelligent Agents, Web Technologies and Internet Commerce (CIMCA-IAWTIC'06), IEEE Computer Society, Aug. 17, 2009, 6 pages.
Hauptmann, "Speech and Gestures for Graphic Image Manipulation", CHI'89 Proceedings, Department of Computer Science, Carnegie-Mellon University, Pittsburgh, Penn., May 1989, 20(SI), 241-245.
Qian et al., "A Gesture-Driven Multimodal Interactive Dance System", IEEE International Conference on Multimedia and Expo,Taipei, Jun. 2004, vol. 3, pp. 1579-1582.
Shivappa et al., "Person Tracking with Audio-Visual Cues Using Iterative Decoding Framework", IEEE Fifth International Conference on Advanced Video and Signal Based Surveillance, AVSS '08, Santa Fe, MN, Sep. 1-3, 2008, pp. 260-267.
U.S. Patent Application entitled "Sentence Simplification for Spoken Language Understanding" having U.S. Appl. No. 13/106,374, filed May 12, 2011.
U.S. Official Action dated May 10, 2012, in U.S. Appl. No. 12/604,526. 21 pgs.
International Search Report & Written Opinion in PCT/US2012/031722 dated Oct. 23, 2012.
International Search Report & Written Opinion in PCT/US2012/031736 dated Oct. 31, 2012.
International Search Report & Written Opinion in PCT/US2012/030730 dated Oct. 30, 2012.
International Search Report & Written Opinion in PCT/US2012/030636 dated Oct. 31, 2012.
International Search Report & Written Opinion in PCT/US2012/030740 dated Nov. 1, 2012.
International Search Report & Written Opinion in PCT/US2012/030757 dated Nov. 1, 2012.
International Search Report & Written Opinion in PCT/US2012/030751 dated Sep. 5, 2012.
Tur, et al., "Sentence Simplification for Spoken Language Understanding", In Proceedings of International Conference on Acoustics, Speech and Signal Processing, May 22, 2011, 4 pages.
Hakkani-Tur, et al., "Mining Search Query Logs for Spoken Language Understanding", In Workshop on Future Directions and Needs in the Spoken Dialog Community: Tools and Data, Jun. 7, 2012, pp. 37-40.
Riezler, et al., "Query Rewriting Using Monolingual Statistical Machine Translation", In Journal of Computational Linguistics Archive, vol. 36, Issue 3, Sep. 2010, pp. 569-582.
Agichtein, et al., "Improving Web Search Ranking by Incorporating User Behavior Information", In Proceedings of the 29th Annual

(56) References Cited

OTHER PUBLICATIONS

International ACM SIGIR Conference on Research and Development in Information Retrieval, Aug. 6, 2006, 8 pgs.
Hakkani-Tur, et al., "Exploiting Query Click Logs for Utterance Domain Detection in Spoken Language Understanding", In Proceedings of International Conference on Acoustics, Speech and Signal Processing, May 22, 2011, 4 pages.
Hakkani-Tur, et al., "Employing Web Search Query Click Logs for Multi-Domain Spoken Language Understanding", In Proceedings of IEEE Workshop on Automatic Speech Recognition and Understanding, Dec. 11, 2011, 6 pgs.
Kok, et al., "Hitting the Right Paraphrases in Good Time", In Proceedings of Human Language Technologies: The Annual Conference of the North American Chapter of the Association for Computational Linguistics, Jun. 2010, 9 pgs.
Koehn, et al., "Moses: Open Source Toolkit for Statistical Machine Translation", In Proceedings of the Annual Meeting of the Association for Computational Linguistics, Demonstration and Poster Session, Jun. 2007, 4 pages.
Och, et al., "A Systematic Comparison of Various Statistical Alignment Models", In Journal of Computational Linguistics, vol. 29, Issue 1, Mar. 2003, 33 pages.
Tur, et al., "Model Adaptation for Dialog Act Tagging", In Proceedings of IEEE Spoken Language Technology Workshop, Dec. 10, 2006, 4 pages.
Haffner, et al., "Optimizing SVMS for Complex Call Classification", In Proceedings of IEEE International Conference on Acoustics, Speech and Signal Processing, Apr. 6, 2003, 4 pages.
Mittal, et al., "A Hybrid Approach of Personalized Web Information Retrieval." Proceedings of the 2010 IEEE/WIC/ACM International Conference on Web Intelligence and Intelligent Agent Technology, Aug. 31, 2010, vol. 1, pp. 308-313.
D. Hakkani-Tur, G. Tür, L. Heck, and E. Shriberg, "Bootstrapping Domain Detection Using Query Click Logs for New Domains," in Proceedings of Interspeech, Florence, Italy, 2011.
D. Hillard, A. Celikyilmaz, D. Hakkani-Tür, and G. Tur, "Learning Weighted Entity Lists from Web Click Logs for Spoken Language Understanding," in Proceedings of Interspeech, Florence, Italy, 2011.
A. Celikyilmaz, D. Hakkani-Tür, and G. Tur, "Approximate Interference for Domain Detection in Spoken Language Understanding," in Proceedings of Interspeech, Florence, Italy, 2011.
U.S. Patent Application entitled "Translating Natural Language Utterances to Keyword Search Queries" having U.S. Appl. No. 13/592,638, filed Aug. 23, 2012.
U.S. Official Action dated Aug. 24, 2012, in U.S. Appl. No. 13/077,431.
U.S. Official Action dated Jun. 4, 2013, in U.S. Appl. No. 13/077,368.
U.S. Restriction Requirement dated Nov. 2, 2012, in U.S. Appl. No. 13/077,368.
U.S. Official Action dated Jun. 11, 2013, in U.S. Appl. No. 13/077,455.
U.S. Official Action dated Jul. 25, 2013 in U.S. Appl. No. 13/077,431.
U.S. Official Action dated Aug. 1, 2013 in U.S. Appl. No. 13/076,862.
U.S. Official Action dated May 15, 2014 in U.S. Appl. No. 13/106,374, 56 pgs.
G. Tur and R. D. Mori, Eds., Spoken Language Understanding: Systems for Extracting Semantic Information from Speech. New York, NY: John Wiley and Sons, 2011, 484 pgs.
U.S. Official Action dated Dec. 24, 2013 in U.S. Appl. No. 13/592,638, 31 pgs.
U.S. Official Action dated Jan. 28, 2014, in U.S. Appl. No. 13/077,455, 27 pgs.
U.S. Official Action dated Feb. 24, 2014, in U.S. Appl. No. 13/077,396, 50 pgs.
U.S. Official Action dated Feb. 28, 2014, in U.S. Appl. No. 13/077,233, 53 pgs.
U.S. Official Action dated Mar. 20, 2014 in U.S. Appl. No. 13/076,862, 35 pgs.
U.S. Official Action dated Mar. 20, 2014, in U.S. Appl. No. 13/077,368, 22 pgs.
"International Search Report & Written Opinion for PCT Patent Application No. PCT/US2013/055232", dated Nov. 18, 2013, Filed Date: Aug. 16, 2013, 10 Pages.
U.S. Official Action dated Sep. 5, 2014, in U.S. Appl. No. 13/077,431, 38 pgs.
U.S. Official Action dated Sep. 15, 2014, in U.S. Appl. No. 13/077,368, 12 pgs.
U.S. Official Action dated Oct. 2, 2014 in U.S. Appl. No. 13/106,374, 42 pgs.
U.S. Official Action dated Oct. 10, 2014, in U.S. Appl. No. 13/077,233, 51 pgs.
U.S. Official Action dated Jun. 26, 2014, in U.S. Appl. No. 13/077,455, 26 pgs.
Richard A. Bolt, "Put-That-There: Voice and Gesture at the Graphics Interface", Architecture Machine Group, MIT, 1980, 9 pgs.
U.S. Official Action dated Oct. 29, 2014, in U.S. Appl. No. 13/077,455, 27 pgs.
U.S. Official Action dated Nov. 19, 2014, in U.S. Appl. No. 13/077,396, 55 pgs.
Notice of Allowance dated Feb. 17, 2015 in U.S. Appl. No. 13/592,638, 12 pgs.
U.S. Official Action dated Mar. 19, 2015, in U.S. Appl. No. 13/077,431, 24 pgs.
U.S. Patent Application entitled "Translating Natural Language Utterances to Keyword Search Queries" having U.S. Appl. No. 14/733,188, filed Jun. 8, 2015.
EP Extended Search Report Received for European Patent Application No. 12763913.6, dated Sep. 1, 2015, 13 pgs.
Taiwan Search Report Issued in Patent Application No. 101105673, dated Oct. 16, 2015, 9 Pages.
Klusch; "Information Agent Technology for the Internet: A Survey"; Data & Knowledge Engineering; vol. 36, Mar. 1, 2001, 36 pgs.
Panton et al., "Common Sense Reasoning—From Cyc to Intelligent Assistant"; Cycorp, Inc.; Jan. 1, 2006; Ambient Intelligence in Everyday Life Lecture Notes in Computer Science; 32 pgs.
Kolski et al., "A Review of Intelligent Human-Machine Interfaces in the Light of the ARCH Model"; Published online Nov. 13, 2009; International Journal of Human-Computer Interaction; vol. 10, No. 3; Sep. 1, 1998.
Notice of Allowance dated Sep. 18, 2015, in U.S. Appl. No. 13/077,455, 22 pgs.
Notice of Allowance dated Oct. 7, 2015, in U.S. Appl. No. 13/077,368, 24 pgs.
EP Communication dated Apr. 20. 2015 in Application No, PCT/US2012/030636, 8 pgs.
EP Supplementary Search Report Received for European Patent Application No. PCT/US2012/031736, dated May 11, 2015, 10 Pages.
EP Search Report Issued in European Patent Application No. PCT/US2012/030730, dated May 11, 2015, 9 Pages.
EP Supplementary Search Report Issued in European Patent Application No, PCT/US2012/031722, dated May 11, 2015, 11 Pages.
EP Search Report Received for European Patent Application No. 12765896.1, dated May 28, 2015, 12 Pages.
Díaz et al., "CO-Pretégé: A Groupware Tool for Supporting Collaborative Ontology Design with Divergence"; alicia.diaz@sol.info.unlp.edu.ar; Jul. 18, 2005; [retrieved Mar. 26, 2015]; 4 pgs. (cited in Apr. 20, 2015 EP Comm).
Hu, et al., "SmartContext: An Ontology Based Context Model for Cooperative Mobile Learning", In Computer Supported Cooperative Work in Design III, May 3, 2006, pp. 717-726 (cited in May 11, 2015 EP Supp ISR).
Siebra, et al., "SmartChat—An Intelligent Environment for Collaborative Discussions", In Proceedings of 7th International Conference on Intelligent Tutoring Systems, Aug. 30, 2004; pp. 883-885 (cited in EP Supp ISR).
Cozzolongo, et al., "Personalized Control of Smart Environments", In Lecture Notes in Computer Science, vol. 4511, Jul. 25, 2007, 5 Pages (cited in May 28, 2015 EP ISR).

(56) References Cited

OTHER PUBLICATIONS

Nijholt, et al., "Google Home: Experience, Support and Re-Experience of Social Home Activities", In Information Sciences, vol. 178, Issue 3, Nov. 6, 2007, 19 Pages (cited in May 28, 2015 EP ISR).
Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 Pages (cited in May 28, 2015 EP ISR).
Notice of Allowance dated Dec. 3, 2014 in U.S. Appl. No. 13/592,638, 23 pgs.
U.S. Official Action dated Apr. 9, 2015, in U.S. Appl. No. 13/077,368, 18 pgs.
U.S. Official Action dated May 5, 2015, in U.S. Appl. No. 13/077,455, 14 pgs.
U.S. Official Action dated May 28, 2015 in U.S. Appl. No. 13/106,374, 44 pgs.
U.S. Official Action dated Jun. 4, 2015, in U.S. Appl. No. 13/077,396, 35 pgs.
U.S. Official Action dated Jul. 1, 2015 in U.S. Appl. No. 13/076,862, 60 pgs.
U.S. Patent Application entitled "Location-Based Conversational Understanding" having U.S. Appl. No. 14/989,974, filed Jan. 7, 2016.
Chinese Office Action and Search Report Issued in Patent Application No. 201210092263.0, dated Dec. 10, 2015, 15 pgs.
Chinese Office Action and Search Report Issued in Patent Application No. 201210101485.4, dated Dec. 11, 2015, 14 Pages.
Taiwan Notice of Allowance Issued in Patent Application No. 101105673, dated Mar. 2, 2016, 4 Pages.
Japanese Office Action in Application 2014-502721, dated Mar. 3, 2016, 10 pgs. (331339.05).
U.S. Official Action dated Nov. 27, 2015, in U.S. Appl. No. 13/077,431, 15 pgs.
U.S. Official Action dated Dec. 4, 2015, in U.S. Appl. No. 13/077,396, 45 pgs.
U.S. Official Action dated Dec. 4, 2015, in U.S. Appl. No. 13/106,374, 64 pgs.
U.S. Official Action dated Jan. 14, 2016 in U.S. Appl. No. 13/076,862, 44 pgs.
U.S. Appl. No. 13/077,233, Office Action dated Apr. 18, 2016, 36 pgs.
Notice of Allowance dated Dec. 18, 2015, in U.S. Appl. No. 13/077,455, 2 pgs.
Notice of Allowance dated Dec. 3, 2015, in U.S. Appl. No. 13/077,455, 2 pgs.
Chinese Office Action in Application 201210087420.9, dated May 5, 2016, 18 pgs.
U.S. Appl. No. 13/077,396, Office Action dated May 19, 2016, 36 pgs.
U.S. Appl. No. 13/106,374, Notice of Allowance dated May 13, 2016, 16 pgs.
U.S. Appl. No. 13/106,374, Notice of Allowance dated May 27, 2016, 2 pgs.
Japanese Office Action in Application 2014-502723, dated Apr. 27, 2016, 7 pages.
Japanese Office Action in Application 2014-502718, dated May 20, 2016, 9 pages.
Chinese Office Action in Application 201210093414.4, dated Jun. 3, 2016, 16 pages.
Chinese Office Action in Application 2012100911763, dated May 25, 2016, 14 pages.
Chinese Office Action in Application 201210090349, dated Jun. 15, 2016, 13 pages.
U.S. Appl. No. 13/076,862, Notice of Allowance dated May 3, 2017, 14 pgs.
U.S. Appl. No. 14/989,974, Office Action dated Mar. 29, 2017, 16 pgs.
U.S. Appl. No. 13/077,431, Office Action dated Jun. 29, 2016, 16 pgs.
U.S. Appl. No. 13/106,374, Notice of Allowance dated Aug. 4, 2016, 2 pgs.
U.S. Appl. No. 14/733,188, Office Action dated Oct. 25, 2016, 16 pages.
Chinese Office Action in Application 201210090634.1, dated Jun. 30, 2016, 10 pgs.
Chinese 2nd Office Action in Application 201210092263.0, dated Aug. 16, 2016, 5 pgs.
Chinese 2nd Office Action in Application 201210101485.4, dated Aug. 16, 2016, 5 pgs.
U.S. Appl. No. 13/077,233, Office Action dated Nov. 10, 2016, 41 pages.
Wang et al., "Web-Based Unsupervised Learning for Query Formation in Question Answering", Proc 2nd Intl Joint Conf on Natural Language Processing, Oct. 2005, 12 pages.
U.S. Appl. No. 13/076,862, Notice of Allowance dated Dec. 1, 2016, 16 pages.
Chinese Office Action in Application 201210091176.3, dated Dec. 21, 2016, 9 pages.
Japanese Office Action in Application 2014502721, dated Nov. 25, 2016, 4 pages.
Japanese Notice of Allowance in Application 2014502723, dated Jan. 4, 2017, 3 pages. (No English Translation.)
U.S. Appl. No. 13/077,396, Office Action dated Jan. 27, 2017, 36 pages.
Chinese Office Action in Application 201210087420.9, dated Jan. 12, 2017, 5 pages.
Cao et al., "Integrating Word Relationships into Language Models," In Proceedings of 28th Annual International ACM SIGIR Conference on Research and Development in Information Retrieval, Aug. 15, 2005, 8 pages.
Chu-Carroll et al., "A Hybrid Approach to Natural Language Web Search," Proc of Conf on Empirical Methods in Natural Language Processing, Jul. 2002, Association for Computational Linguistics, 8 pages.
Di Buccio Emanuele et al., "Detecting verbose queries and improving information retrieval," Information Processing & Management, vol. 50, No. 2, Oct. 28, 2013, 19 pages.
Goodwin, "Which Search Engine Would be a Jeopardy Champion?" retrieved Apr. 12, 2012 from http://searchenginewatch.com/article/2050114/which-search-engine-would-be-a-jeopardy-champion, Jan. 2011, 2 pages.
Gupta et al., "Information Retrieval with Verbose Queries", Foundations and Trends in Information Retrieval, vol. 9, No. 3-4, Jul. 31, 2015, pp. 209-354.
Huston et al., "Evaluating verbose query processing techniques", Proceedings of the 33rd International ACM Sigir Conference on Research and Development in Information Retrieval, Sigir '10, ACM Press, New York, New York, Jul. 19, 2010, pp. 291-298.
Molla et al., "AnswerFinder at TREC 2004," In Proceedings of the Thirteenth Text Retrieval Conference, TREC, Nov. 16, 2004, 9 pages.
PCT International Search Report in PCT/US2013/049085, dated Nov. 7, 2013, 8 pages.
PCT International Search Report in PCT/US2016/050840, dated Dec. 6, 2016, 12 pages.
U.S. Appl. No. 13/077,431, Office Action dated Feb. 3, 2017, 16 pages.
U.S. Appl. No. 13/539,674, Office Action dated Mar. 17, 2015, 12 pages.
U.S. Appl. No. 13/539,674, Office Action dated Oct. 27, 2015, 15 pages.
Chinese Office Action in Application 201210101485.4, dated Feb. 20, 2017, 5 pages.
Chinese Notice of Allowance in Application 201210093414.4, dated Feb. 9, 2017, 8 pages.
Japanese Notice of Allowance in Application 2014502718, dated Feb. 1, 2017, 3 pages. (No English Translation.)
Chinese Notice of Allowance in Application 201210092263.0, dated Feb. 28, 2017, 4 pgs.
Chinese 2nd Office Action in Application 201210090349.X, dated Feb. 28, 2017, 9 pgs.

(56) References Cited

OTHER PUBLICATIONS

Chinese 2nd Office Action in Application 201210090634.1, dated Mar. 21, 2017, 9 pgs.
Chinese Notice of Allowance in Application 201210087420.9, dated May 4, 2017, 3 pgs.
Chinese Notice of Allowance in Application 201210101485.4, dated Jun. 29, 2017, 4 pages.
PCT 2nd Written Opinion in International Application PCT/US2016/050840, dated Jul. 24, 2017, 7 pages.
U.S. Appl. No. 13/077,233, Appeal Brief filed Jun. 12, 2017, 32 pages.
U.S. Appl. No. 13/077,396, Notice of Allowance dated Jul. 28, 2017, 25 pages.
U.S. Appl. No. 13/077,431, Office Action dated Jul. 14, 2017, 15 pages.
Chinese Decision on Rejection in Application 201210091176.3, dated Aug. 2, 2017, 11 pages.
U.S. Appl. No. 13/077,233, Examiner's Answer to the Appeal Brief dated Aug. 4, 2017, 13 pages.
U.S. Appl. No. 14/989,974, Office Action dated Aug. 14, 2017, 20 pgs.

\* cited by examiner

PERSONALIZATION OF QUERIES, CONVERSATIONS, AND SEARCHES

RELATED APPLICATIONS

This patent application is also related to and filed concurrently with U.S. patent application Ser. No. 13/076,862 entitled "Augmented Conversational Understanding Agent," filed on Mar. 31, 2011; U.S. patent application Ser. No. 13/077,233 entitled "Conversational Dialog Learning and Correction," filed on Mar. 31, 2011; U.S. patent application Ser. No. 13/077,368, entitled "Combined Activation for Natural User Interface Systems," filed on Mar. 31, 2011; U.S. patent application Ser. No. 13/077,396, entitled "Task Driven User Intents," filed on Mar. 31, 2011; U.S. patent application Ser. No. 13/077,431, entitled "Augmented Conversational Understanding Architecture," filed on Mar. 31, 2011; U.S. patent application Ser. No. 13/077,455 entitled "Location-Based Conversational Understanding," filed on Mar. 31, 2011; which are assigned to the same assignee as the present application and expressly incorporated herein, in their entirety, by reference.

BACKGROUND

An augmented conversational understanding architecture may provide a mechanism for personalizing queries, conversations and searches. In some situations, personal assistant programs and/or search engines often require specialized formatting and syntax. For example, a user's query of "I want to go see 'Inception' around 7" may be ineffective at communicating the user's true intentions when provided to a conventional system. Such systems may generally be incapable of deriving the context that the user is referring to a movie, and that the user desires results informing them of local theatres showing that movie around 7:00.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Personalization of user interactions may be provided. Upon receiving a phrase from a user, a plurality of semantic concepts associated with the user may be loaded. If the phrase is determined to comprise at least one of the plurality of semantic concepts associated with the user, a first action may be performed according to the phrase. If the phrase is determined not to comprise at least one of the plurality of semantic concepts associated with the user, a second action may be performed according to the phrase.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
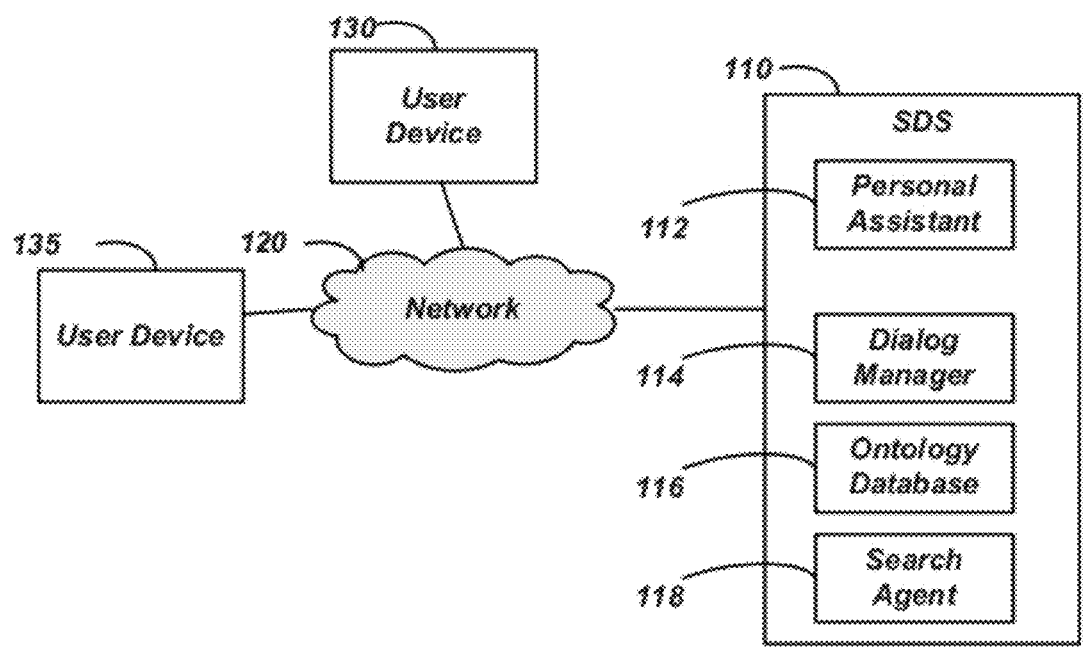
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A cloud (e.g., network storage-based) based service may allow for user personalization of searches, queries or instructions to a personal assistant (e.g., a software program). The ability to personalize such queries or instructions may be provided by rule driven techniques in conjunction with various ontologies and using the search terms, instruction statements and the user contexts to provide more accurate search or query results.

Natural language speech recognition applications may allow for personalization of searches and actions. Components may focus on the user experience and/or provide a personalization engine, such as via components of a SDS. A user experience component may be available as part of a web search application via a browser running on a general purpose desktop or laptop computer or a specialized computing device such as a smart phone or a information kiosk in a mall. A personalization engine component may store various ontologies, iterate through a query to identify a user's intent, and attempt to match a semantic representation of the query to a particular ontology. For example, ABC Company may populate a shared ontology that may define semantic concepts such as creating an appointment. The semantic concept may be associated with attributes such as calendar servers, scheduling services, and synonyms (e.g., the term "S+" may be defined as a shortcut synonym for setting up a meeting). If the user is an employee of ABC Co., the term S+ ("S plus") may be inherited from the shared ontology and recognized as a shortcut to setting up an appointment using Outlook®. The personalization engine may also use additional user contexts (e.g., location, or previous state information) to merge additional shared ontologies.

Other examples of personalization may comprise the user asking for "John Hardy's"; because the user is originally from Minnesota, the SDS may retrieve this information from the user's personal ontology (derived from profile, usage history, and other sources such as contacts and messaging content) and know that the user is looking for the BBQ restaurant located in Rochester, Minn. If the user refers to "Rangers" the SDS may be able to infer, based on the personal ontology, that the user intends "NY Rangers" since they are a hockey fan. If the user were known to be a baseball fan, the user's intent may be interpreted as referring instead to the "Texas Rangers." Such intent deciphering may be in combination with contextual information such as the time of year, what teams are playing that day, etc.

A Spoken Language Understanding (SLU) component (e.g., a translator) may receive a spoken or written conversation between users and/or a single-user originating query. The SLU may parse the words of a voice or text conversation and select certain items which may be used to fill out an XML data frame for particular contexts. For example, a restaurant context may have certain slots such as "type of food", "location/address", "outdoor dining", "reservations required", "hours open", "day of week", "time", "number of persons", etc. The SLU may attempt to fill different context data frames with both the parsed words from the conversation or query, and with other external information, such as GPS location information. The SLU may keep state during the conversation and fill the slots over the course of the conversation. For example, if user 1 says "How about tonight" and user 2 says "Saturday is better", the SLU may initially fill tonight in the day of the week slot and then fill Saturday in the day of the week slot. If a certain number of the slots in a particular context frame are filled, the SLU may infer that the context is correct and estimate the user intention. The SLU may also prompt the user for more information related to the intent. The SLU may then provide options to the user based on the determined user intent.

FIG. 1 is a block diagram of an operating environment 100 comprising a spoken dialog system (SDS) 110. SDS 110 may comprise assorted computing and/or software modules such as a personal assistant program 112, a dialog manager 114, an ontology 116, and/or a search agent 118. SDS 110 may receive queries and/or action requests from users over network 120. Such queries may be transmitted, for example, from a first user device 130 and/or a second user device 135 such as a computer and/or cellular phone. Network 120 may comprise, for example, a private network, a cellular data network, and/or a public network such as the Internet. Consistent with embodiments of the invention, SDS 110 may be operative to monitor conversations between first user device 130 and second user device 135.

Spoken dialog systems enable people to interact with computers with their voice. The primary component that drives the SDS may comprise dialog manager 114. This component may manage the dialog-based conversation with the user. Dialog manager 114 may determine the intention of the user through a combination of multiple sources of input, such as speech recognition and natural language understanding component outputs, context from the prior dialog turns, user context, and/or results returned from a knowledge base (e.g., search engine). After determining the intention, dialog manager 114 may take an action, such as displaying the final results to the user and/or continuing in a dialog with the user to satisfy their intent.

Figure 2:
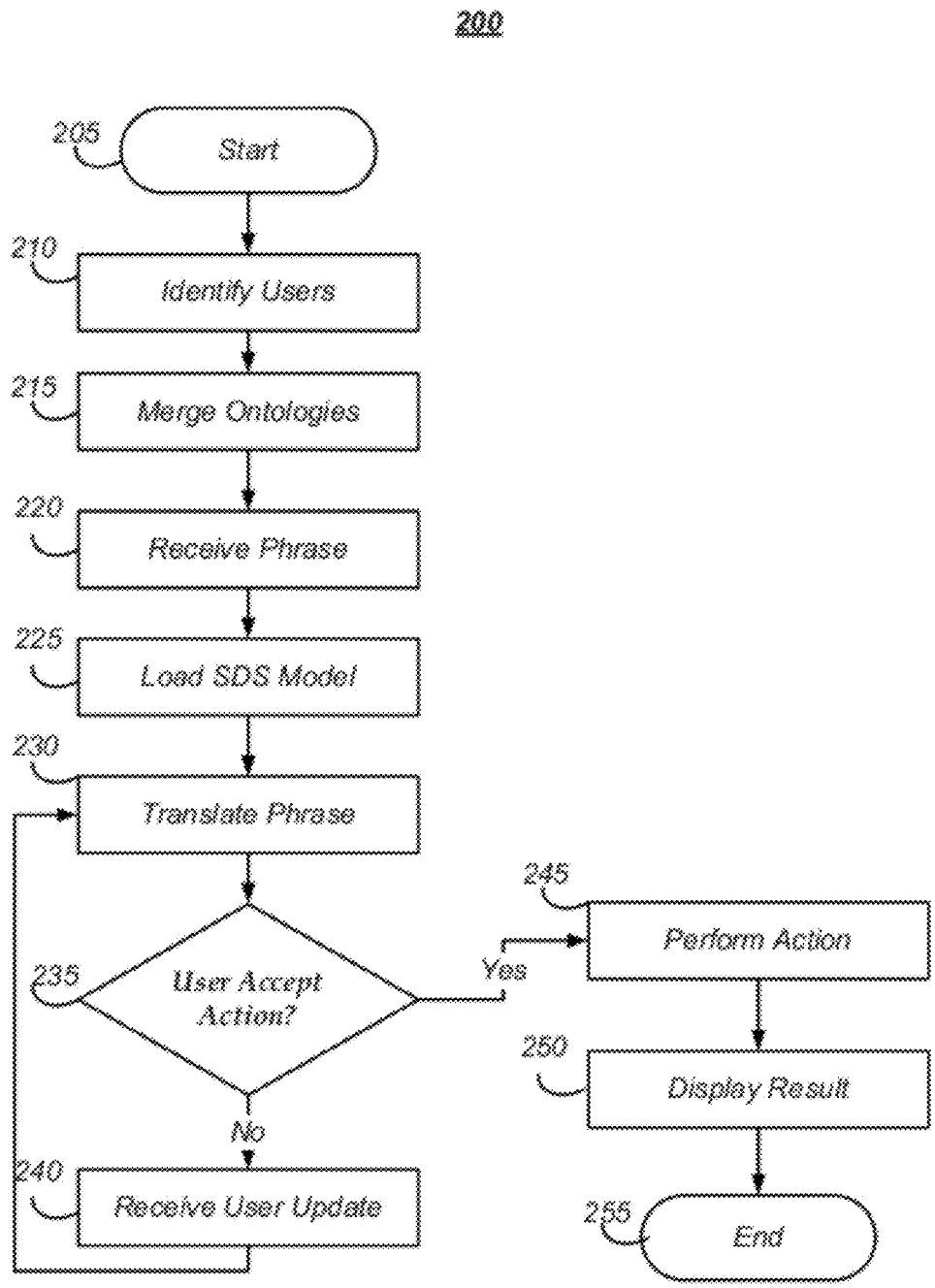
FIG. 2 is a flow chart of a method for providing an augmented conversational understanding architecture.

FIG. 2 is a flow chart setting forth the general stages involved in a method 200 consistent with an embodiment of the invention for providing a personalized user experience. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may identify a plurality of users associated with a conversation. For example, SDS 110 may monitor a conversation between a first user of first user device 130 and a second user of second user device 135. The first user and second user may be identified, for example, via an authenticated sign-in with SDS 110 and/or via identifying software and/or hardware IDs associated with their respective devices.

Method 200 may then advance to stage 215 where computing device 400 may merge a plurality of ontologies. For example, SDS 110 may load an ontology associated with the first user and the second user from ontology database 116. Each of the plurality of ontologies may comprise a plurality of semantic concepts and/or attributes associated with characteristics of at least one of the users, such as a workplace associated with a user, a contacts database, a calendar, a previous action, a previous communication made by and/or between the users, a context, and/or a profile. Consistent with embodiments of the invention, the merger may comprise merging either and/or both users' ontologies with a shared/global ontology. For example, a search engine may provide a shared ontology comprising data gathered and synthesized across many users, while a network application may publish an ontology comprising attributes associated with publicly available applications. A shared ontology may also be associated with an organization and may comprise attributes common to multiple employees. Merging one ontology with another may comprise, for example, creating associations between common terms, adding synonyms to a node, adding additional attribute nodes, sub nodes, and/or branches, and/or adding connections between nodes.

Method 200 may then advance to stage 220 where computing device 400 may receive a natural language phrase from a user. For example, SDS 110 may receive a phrase spoken and/or typed by the user into first user device 130.

Method 200 may then advance to stage 225 where computing device 400 may load a model associated with a spoken dialog system. For example, SDS 110 may load a language dictionary associated with the user's preferred spoken language.

Method 200 may then advance to stage 230 where computing device 400 may translate the natural language phrase into an agent action. For example, the phrase may be scanned for concepts that correlate to a search domain and/or an executable action associated with a network application. Words such as "dinner tonight" may scan to a "restaurant" search domain associated with a search action. Each domain may be associated with a plurality of slots that may comprise attributes for defining the scope of the action. For example, a restaurant domain may comprise slots for party size, type of cuisine, time, whether outdoor seating is available, etc. Dialog manager 114 may attempt to fill these slots based on the natural language phrase.

Method 200 may then advance to stage 235 where computing device 400 may determine whether the recognition is acceptable. For example, dialog manager 114 may be unable to fill enough slots to provide a complete action, and/or additional phrases may be received from the initial user and/or another user involved in the conversation that modify the agent action prior to execution.

In such cases, method 200 may advance to stage 240 where computing device 400 may receive an update to the agent action. For example, dialog manager may create a restaurant domain agent action for making a reservation. Upon receiving a phrase from a user such as "what about tomorrow instead?", dialog manager may return to stage 230 to translate the new input and update the action accordingly.

Otherwise, once the action is acceptable, method 200 may advance to stage 245 where computing device 400 may perform the action. For example, dialog manager 114 may create a lunch appointment calendar event.

Method 200 may then advance to stage 250 where computing device 400 may display at least one result associated with the performed action to at least one of the plurality of users. For example, SDS 110 may populate the created lunch appointment to calendars associated with each of the first user and second user and/or display a confirmation that the event was created on their respective user devices. Method 200 may then end at stage 265.

Figure 3A:
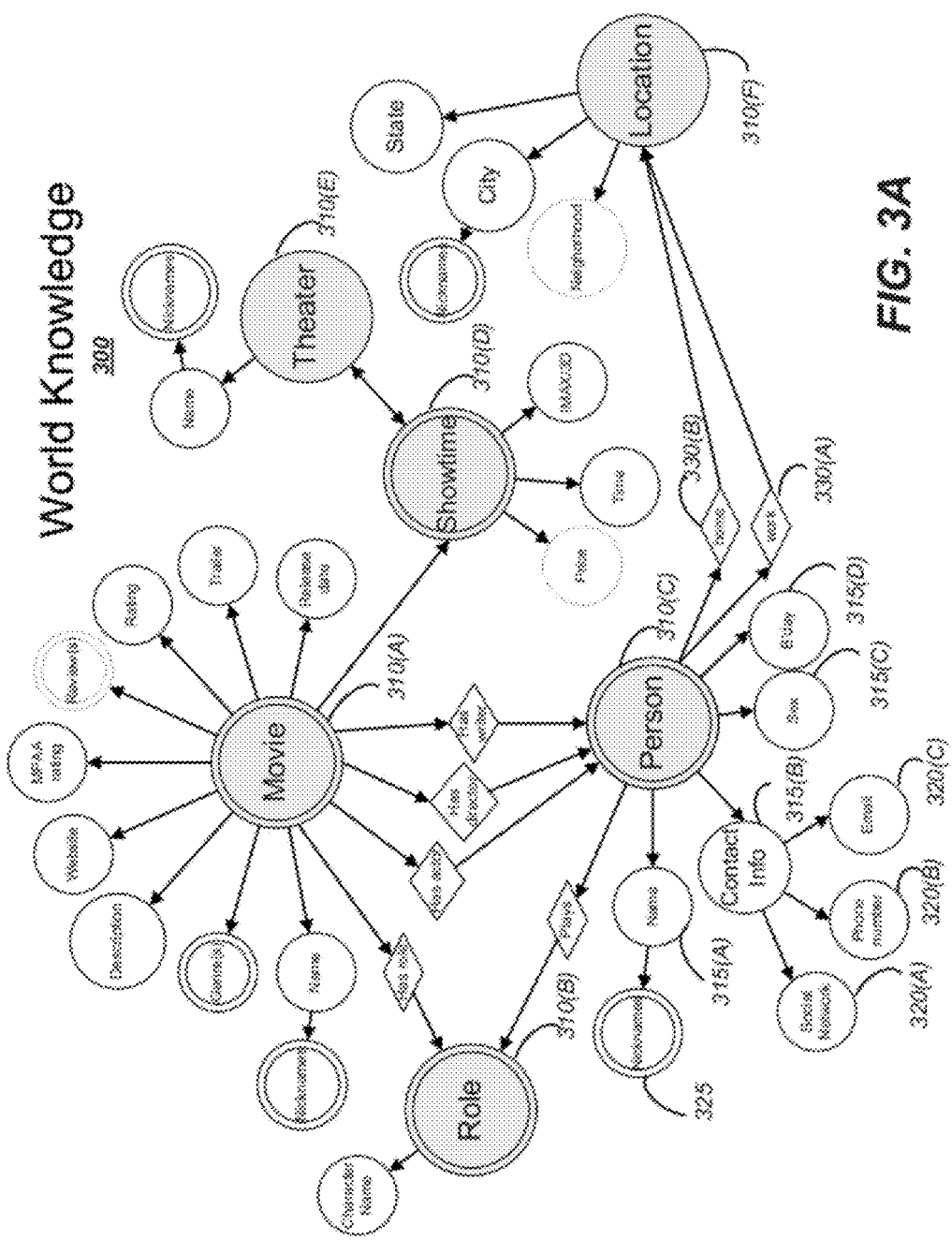
FIGS. 3A-3B are illustrations of example ontologies.

FIG. 3A is an illustration of a shared ontology 300. An ontology may generally comprise a plurality of semantic relationships between concept nodes. Each concept node may comprise a generalized grouping, an abstract idea, and/or a mental symbol and that node's associated attributes. For example, one concept may comprise a person associated with attributes such as name, job function, home location, etc. The ontology may comprise, for example, a semantic relationship between the person concept and a job concept connected by the person's job function attribute. Shared ontology 300 may comprise a plurality of concept nodes 310(A)-(F). Each of the concept nodes may be associated with attribute nodes. For example, person concept node 310(C) may be associated with a plurality of attributes 315(A)-(D). Attributes may be further associated with sub-nodes, such as where contact info attribute node 315(B) is associated with a plurality of sub-nodes 320(A)-(C). Similarly, attribute nodes may be associated with synonyms, such as where name attribute node 315(A) is associated with a nicknames synonym 325. Concept nodes 310(A)-(F) may be interconnected via a plurality of semantic relationships 330(A)-(B). For example, person attribute 310(C) may be connected to location attribute 310(F) via work semantic relationship 330(A) and/or home semantic relationship 330 (B).

Figure 3B:
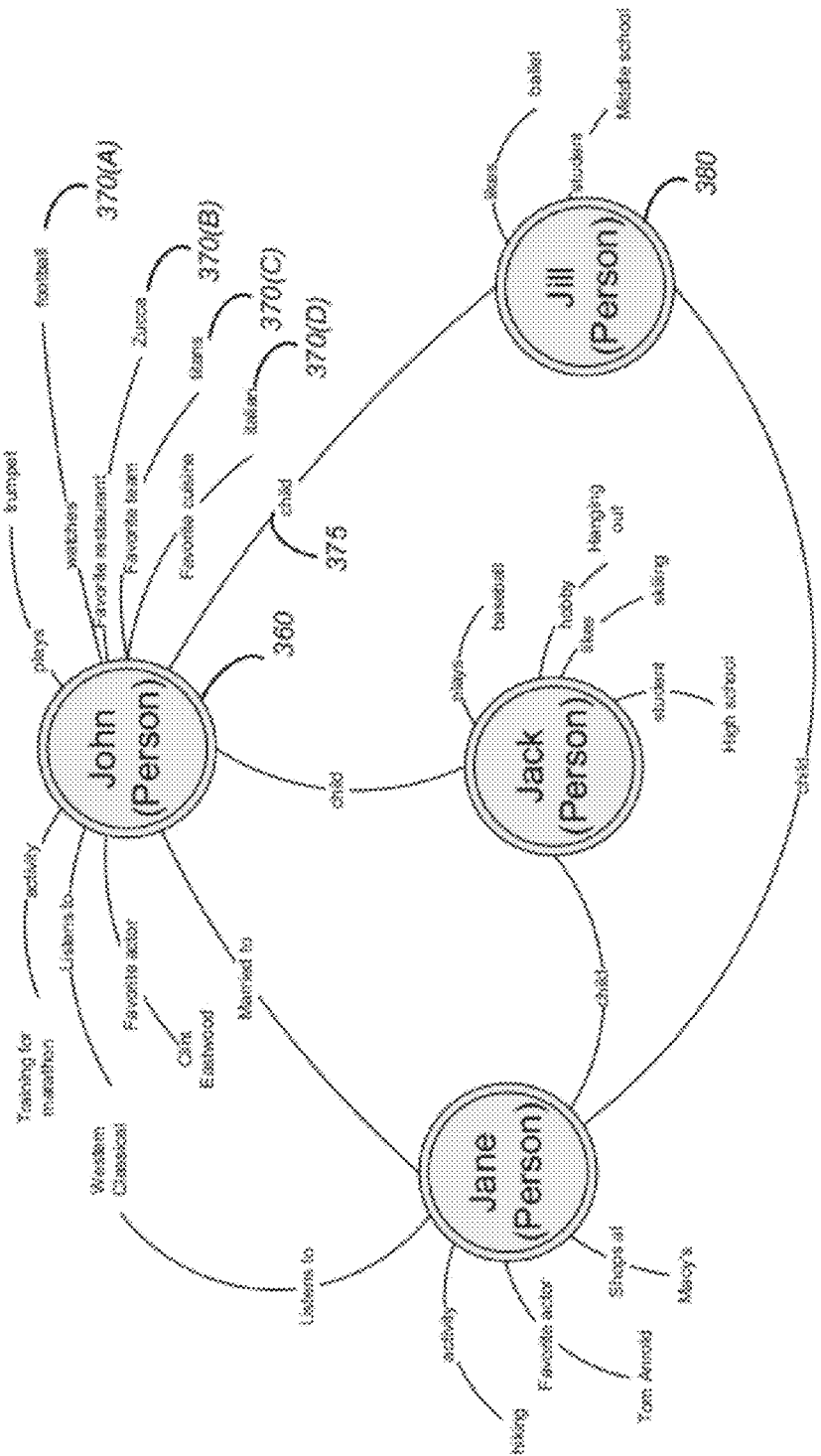

FIG. 3B is an illustration of a personal ontology 350 comprising a user concept node 360. User concept node 360 may comprise a plurality of attribute nodes 370(A)-(D) associated with user details such as preferences, activities, relationships, and/or previous choices. User concept node 360 may comprise a semantic connection 375 associated with another concept node, such as a second user node 380 associated with a child of the user.

An embodiment consistent with the invention may comprise a system for providing a context-aware environment. The system may comprise a memory storage and a processing unit coupled to the memory storage. The processing unit may be operative to receive a phrase from a user, load an ontology associated with the user, determine whether the phrase comprises at least one semantic concept associated with the ontology, and, if not, perform a first action according to the phrase. In response to determining that the phrase comprises a semantic concept associated with the ontology, the processing unit may be operative to perform a second action according to the phrase. The phrase may comprise a spoken natural language phrase and the processing unit may be operative to convert the spoken phrase to a text-based phrase. Consistent with embodiments of the invention, the natural language phrase may comprise a typed phrase.

The ontology may comprise, for example, terms and/or concepts associated with the user's workplace, previous actions, learned phrasing, slang, contact-derived references (e.g., "Billy-boy" equates to a contact named Bill Smith, Jr.), and/or previous communications.

Another embodiment consistent with the invention may comprise a system for providing a personalized user interaction. The system may comprise a memory storage and a processing unit coupled to the memory storage. The processing unit may be operative to receive a phrase from a user, load an ontology associated with the user, translate the received phrase into an agent action, determine whether the phrase comprises at least one of the semantic concepts associated with the ontology, and, if so, modify the agent action, perform the modified agent action, and display at least one result associated with the performed agent action to the user.

The agent action may comprise, for example, a search query, and being operative to modify the action may comprise the processing unit being operative to add a term to the query and/or replace a term of the query with a synonym. The agent action may comprise performing a task within an application, wherein an attribute associated with the ontology comprises a shortcut synonym associated with a semantic concept of performing the task within the application (e.g., a spoken command "exit" may be translated into application tasks of saving all open files and quitting the application). The context associated with the user may comprise, for example, a location of the user, a time the phrase was received, and a date the phrase was received.

The received phrase may be associated with a conversation between the user and at least one second user. The processing unit may then be operative to receive a second phrase from the second user, load a second ontology associated with the second user, merge the two users' ontologies, translate the second received phrase into a second agent action, determine whether the second phrase comprises a semantic concept associated with the merged ontologies, and, if so, modify the agent action, perform the modified agent action, and display at least one result associated with the performed agent action to the second user.

Yet another embodiment consistent with the invention may comprise a system for providing a context-aware environment. The system may comprise a memory storage and a processing unit coupled to the memory storage. The processing unit may be operative to identify a plurality of users associated with a conversation, merge a plurality of ontologies, each associated with one of the users, receive a first natural language phrase from a first user of the plurality of users, translate the natural language phrase into an agent action, and determine whether the agent action is associated with at least one of the semantic concepts associated with the merged ontologies. In response to determining that the phrase comprises the semantic concept associated with the merged ontologies, the processing unit may be operative to modify the agent action. The processing unit may then be operative to receive a second natural language phrase from a second user of the plurality of users, and determine whether the second natural language phrase is associated with the agent action. If so, the processing unit may be operative to update the agent action according to the second natural language phrase. The processing unit may then be operative to perform the agent action and display at least one result associated with the performed agent action to at least one of the plurality of users.

Figure 4:
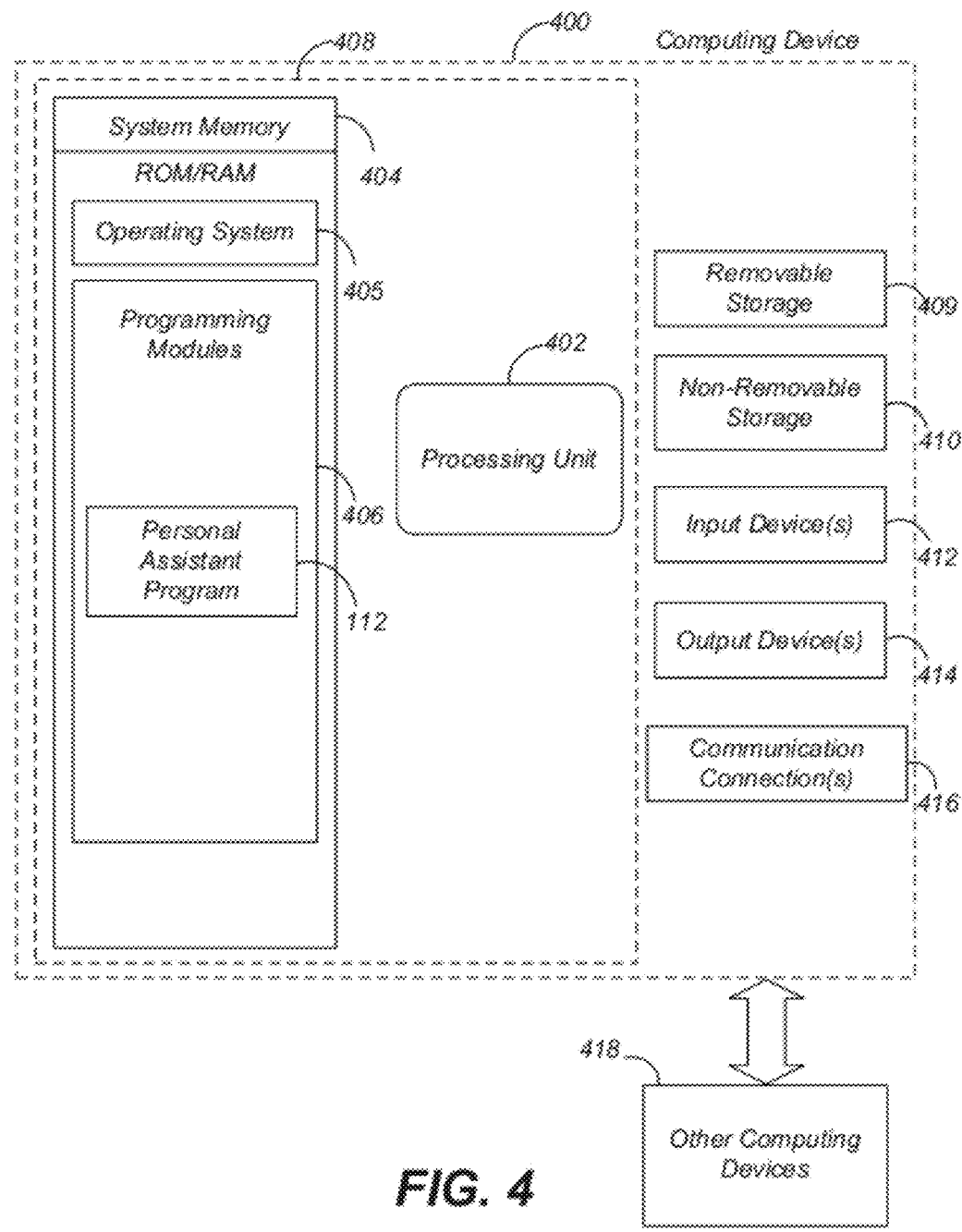
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include personal assistant program 112. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an Intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g., personal assistant program 112) may perform processes including, for example, one or more of method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to, mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-readable data storage device which stores a set of instructions which when executed performs a method for providing a personalized user interaction with a computing device, the method executed by the set of instructions comprising:

receiving a phrase from a user, wherein the received phrase is associated with a conversation between the user and at least one second user;

translating the received phrase into an initial agent action by scanning the received phrase to a search domain associated with a search action;

loading, by a spoken dialog system, an ontology associated with the user, wherein the ontology comprises a plurality of semantic concepts associated with at least one of the following: a workplace associated with the user, a contacts database associated with the user, a calendar associated with the user, a previous action associated with the user, a previous communication associated with the user, a context associated with the user, and a profile associated with the user;

selecting at least one pre-defined shared ontology based on a context associated with the user, the at least one pre-defined shared ontology comprising a plurality of semantic concepts and a plurality of semantic connections between the semantic concepts that are usable to determine intents of phrases associated with the context;

merging the ontology associated with the user with the at least one pre-defined shared ontology to generate a merged ontology;

determining whether the phrase comprises at least one of the plurality of semantic concepts associated with the merged ontology;

in response to determining that the phrase comprises the at least one of the plurality of semantic concepts associated with the merged ontology:

modifying the initial agent action according to the merged ontology to generate a modified agent action, the modified agent action being different than the initial agent action, performing the modified agent action, displaying at least one result associated with the performed agent action to the user;

receiving a second phrase from the at least one second user;

loading a second ontology associated with the at least one second user;

merging the second ontology with the ontology associated with the user;

determining whether the second phrase comprises a response to the received phrase;

in response to determining that the second phrase comprises the response to the received phrase, determining whether the second phrase comprises at least one second semantic concept associated with the merged ontologies; and in response to determining that the second phrase comprises the at least one second semantic concept associated with the merged ontologies:

updating the agent action, performing the updated agent action, and displaying at least one result associated with the performed updated agent action to the user and the at least one second user.

2. The computer-readable data storage device of claim 1, wherein the agent action comprises a search query.

3. The computer-readable data storage device of claim 2, wherein modifying the agent action comprises adding a search term to the search query.

4. The computer-readable data storage device of claim 2, wherein modifying the action comprises replacing at least one term of the search query with a synonym of the at least one of the plurality of semantic concepts associated with the ontology.

5. The computer-readable data storage device of claim 1, wherein the agent action comprises performing a task within an application.

6. The computer-readable data storage device of claim 5, wherein the at least one of the plurality of semantic concepts associated with the ontology comprises a shortcut synonym associated with performing the task within the application.

7. The computer-readable data storage device of claim 1, wherein the context associated with the user comprises at least one of the following: a location of the user, a time the phrase was received, and a date the phrase was received.

8. A computer-readable data storage device which stores a set of instructions which when executed performs a method for providing a personalized user interaction, the method executed by the set of instructions comprising:
receiving a phrase from a user, wherein the received phrase is associated with a conversation between the user and at least one second user;
translating the received phrase into an agent action;
loading an ontology associated with the user, wherein the ontology comprises a plurality of semantic concepts associated with at least one of the following: a workplace associated with the user, a contacts database associated with the user, a calendar associated with the user, a previous action associated with the user, a previous communication associated with the user, a context associated with the user, and a profile associated with the user;
determining whether the phrase comprises at least one of the plurality of semantic concepts associated with the ontology;
in response to determining that the phrase comprises the at least one of the plurality of semantic concepts associated with the ontology:
modifying the agent action according to the ontology,
performing the modified agent action, and
displaying at least one result associated with the performed agent action to the user;
receiving a second phrase from the at least one second user;
loading a second ontology associated with the at least one second user;
merging the second ontology with the ontology associated with the user;
determining whether the second phrase comprises a response to the received phrase;
in response to determining that the second phrase comprises the response to the received phrase, determining whether the second phrase comprises at least one second semantic concept associated with the merged ontologies; and
in response to determining that the second phrase comprises the at least one second semantic concept associated with the merged ontologies:
updating the agent action,
performing the updated agent action, and
displaying at least one result associated with the performed updated agent action to the user and the at least one second user.

9. The computer-readable data storage device of claim 8, wherein the agent action comprises a search query.

10. The computer-readable data storage device of claim 9, wherein modifying the agent action comprises adding a search term to the search query.

11. The computer-readable data storage device of claim 9, wherein modifying the action comprises replacing at least one term of the search query with a synonym of the at least one of the plurality of semantic concepts associated with the ontology.

12. The computer-readable data storage device of claim 8, wherein the agent action comprises performing a task within an application.

13. The computer-readable data storage device of claim 12, wherein the at least one of the plurality of semantic concepts associated with the ontology comprises a shortcut synonym associated with performing the task within the application.

14. The computer-readable data storage device of claim 8, wherein the context associated with the user comprises at least one of the following: a location of the user, a time the phrase was received, and a date the phrase was received.

15. A system for providing a personalized user interaction with a computing device, the system comprising:
a memory storage; and
a processing unit coupled to the memory storage, wherein the processing unit is operative to:
receive a phrase from a user, wherein the received phrase is associated with a conversation between the user and at least one second user;
translate the received phrase into an agent action;
load an ontology associated with the user, wherein the ontology comprises a plurality of semantic concepts associated with at least one of the following: a workplace associated with the user, a contacts database associated with the user, a calendar associated with the user, a previous action associated with the user, a previous communication associated with the user, a context associated with the user, and a profile associated with the user;
determine whether the phrase comprises at least one of the plurality of semantic concepts associated with the ontology;
in response to determining that the phrase comprises the at least one of the plurality of semantic concepts associated with the ontology:
modify the agent action according to the ontology,
perform the modified agent action, and
display at least one result associated with the performed agent action to the user;
receive a second phrase from the at least one second user;
load a second ontology associated with the at least one second user;
merge the second ontology with the ontology associated with the user;
determine whether the second phrase comprises a response to the received phrase;
in response to determining that the second phrase comprises the response to the received phrase, determine whether the second phrase comprises at least one second semantic concept associated with the merged ontologies; and
in response to determining that the second phrase comprises the at least one second semantic concept associated with the merged ontologies:
update the agent action,
perform the updated agent action, and
display at least one result associated with the performed updated agent action to the user and the at least one second user.

16. The system of claim 15, wherein the phrase comprises a natural language phrase.

17. The system of claim 16, wherein the natural language phrase comprises a spoken phrase.

18. The system of claim 17, wherein the processing unit is further operative to convert the spoken phrase to a text-based phrase.

19. The system of claim 16, wherein the natural language phrase comprises a typed phrase.

20. The system of claim 15, wherein the processing unit is configured to translate the received phrase by abstracting at least one word of the phrase into a plurality of synonyms.

* * * * *